Feb. 23, 1943. H. C. THORNE 2,311,715
APPARATUS FOR AND METHOD OF DETECTING FLAWS IN RAILS AND OTHER OBJECTS
Filed Sept. 28, 1937 2 Sheets-Sheet 1
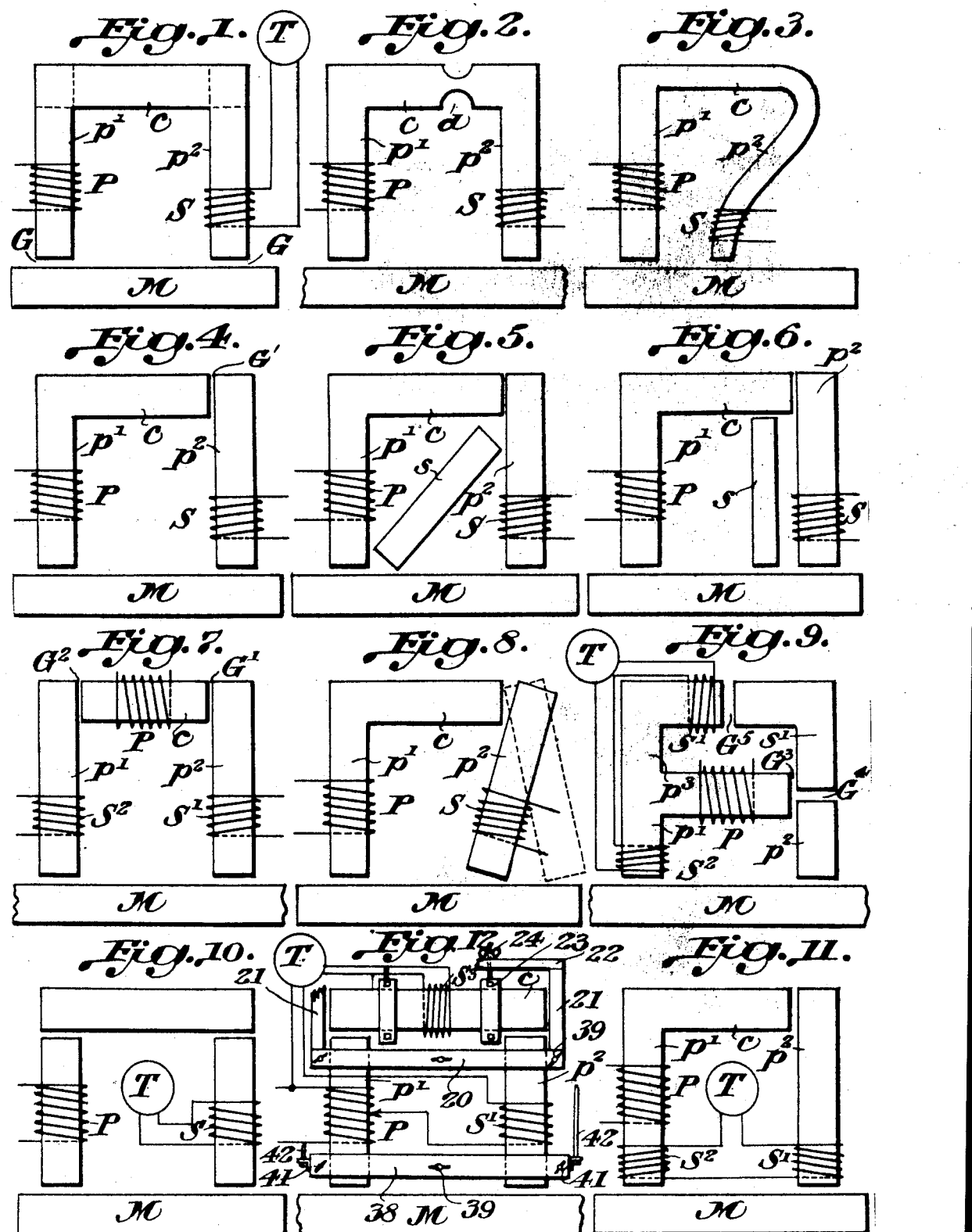

Feb. 23, 1943.  H. C. THORNE  2,311,715
APPARATUS FOR AND METHOD OF DETECTING FLAWS IN RAILS AND OTHER OBJECTS
Filed Sept. 28, 1937   2 Sheets—Sheet 2
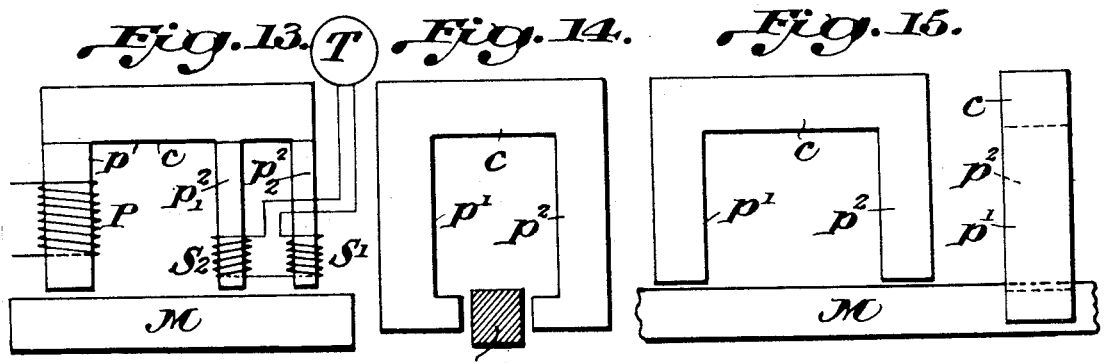
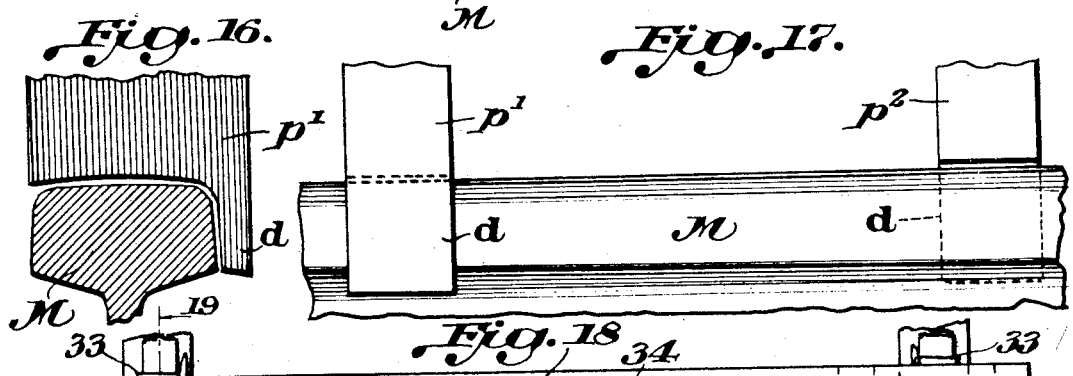
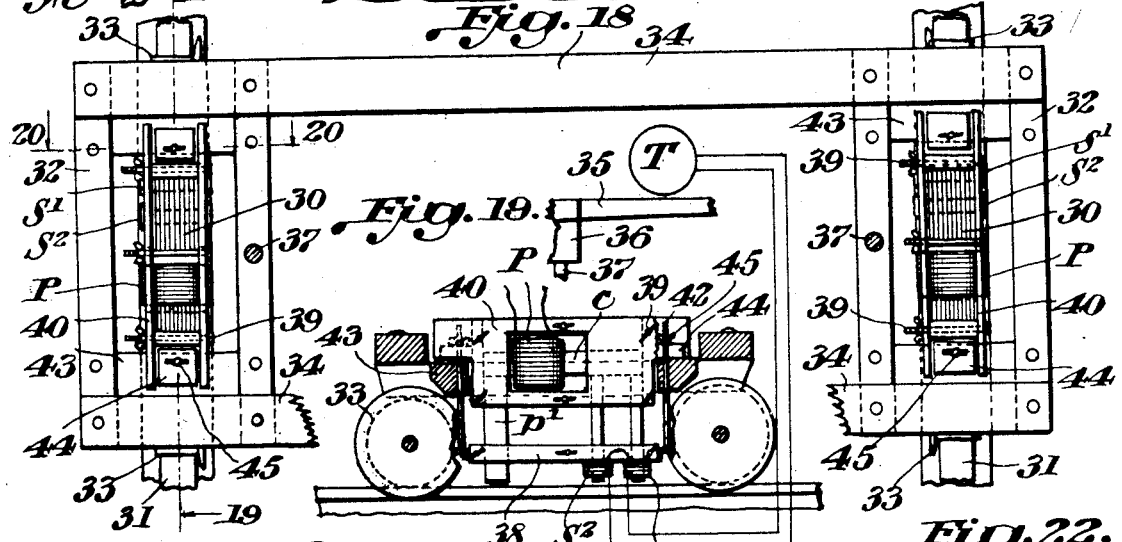
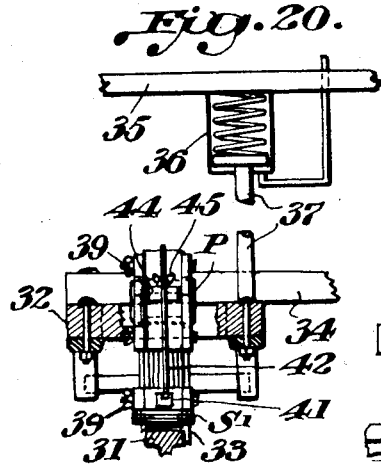
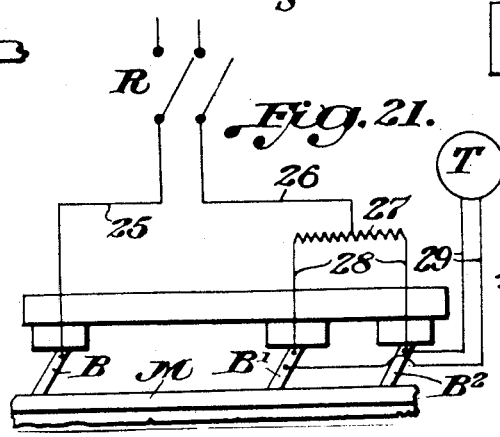
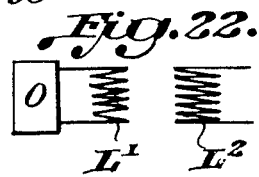
Inventor
Harold C. Thorne Patented Feb. 23, 1943

2,311,715

UNITED STATES PATENT OFFICE 2,311,715

APPARATUS FOR AND METHOD OF DETECTING FLAWS IN RAILS AND OTHER OBJECTS

Harold C. Thorne, Washington, D. C.

Application September 28, 1937, Serial No. 166,183

26 Claims. (Cl. 175—183)

This invention relates to apparatus for and method of detecting flaws in rails and other objects, and particularly to magnetic induction apparatus adapted to cooperate with metallic objects particularly for testing the same for flaws and the like and for energization or operating other equipment, as signal devices, control apparatus and the like. The instant application is thus directed to modifications and improvements of the type of testing apparatus just shown and claimed in my patent, for Rail testing apparatus, No. 2,067,804, issued January 17, 1937, the application for which was filed March 16, 1920, and therefore has for an object to provide improvements in the equipment disclosed therein.

The invention has for an object, therefore, to provide rail testing apparatus cooperating with the rails under test and particularly relates to the electrical relationship of detector elements with respect to the portion of the rail being explored thereby for flaws, and the method of detecting flaws in rails and other objects, as set forth in detail in the specification and claimed hereinafter.

Another object of the invention is to provide means for mounting the apparatus with the detector elements positioned to provide a balanced or determined electrical relationship whereby variations in electrically energized conditions in the portion of the rail under exploration, due to flaws, are effective to disturb the electrical relationship in the detector elements and thereby effect indications thereof with indicating equipment connected with the detector elements.

It is one of the specific objects of the invention to provide induction apparatus of the character of a transformer having an energy supply winding and one or more secondary windings or induction coils which are effected by the presence of a metallic object, preferably having magnetic characteristics, which, however may be non-magnetic or anti-magnetic in character.

Another object of the invention is to so arrange magnetic cores of the magnetic induction transformer of the device as to effect magnetic leakage between the windings thereof and to vary the magnetic effect on the metallic object with which the device may be brought into cooperation as by moving the device with respect thereto or the metallic object with respect to the device.

Another object of the invention is to provide, in such a magnetic induction device, core members which may be adjusted with respect to each other and with respect to energizing and secondary windings of the apparatus as will be more particularly set forth hereinafter.

Another object of the invention is to provide such magnetic induction devices adapted to cooperate in any desired relationship with respect to the object which is in movable relation thereto as will be more fully set forth hereinafter.

Another object of the invention is to so position the secondary cores with respect to the primary cores and each other as to produce a maximum electrical effect in the magnetic circuit of the magnetic induction equipment. This may be actuated by connecting the secondary windings in an additive or subtractive relationship with respect to each other or with respect to the energizing winding or any part thereof.

Another object of the invention in connection with the coupled windings is to provide means for correcting for in certain instances as well as utilizing in other instances any difference in the phase relationship between the several connected windings in the magnetic induction device as affect the circuits therefrom.

Another important object of the invention is to provide in such a magnetic induction device in which the secondary windings are positioned on separated core members which receive divided energy from a main core member or members and on which separated core members the secondary windings may be positioned and connected in bucking relationship with each other and with equipment to be actuated by the differential of the energy which is produced by the bucking windings.

A further object of the invention is to provide apparatus for passing electrical energy into an object at spaced positions and at least one of said positions to divide its passageway and detect variations in the passageway of the energy in and between the divided passageway.

Further objects, details and advantages of the invention will be more fully set forth in the following specification in conjunction with the accompanying drawings and claims hereinafter.

In the drawings:

Fig. 1 is a diagrammatic illustration of an electro-magnetic induction device in accordance with my invention.

Figs. 2 to 8 inclusive illustrate modified forms of core members of such magnetic induction apparatus and their relationship with respect to metallic objects when the same is in cooperation therewith.

Figs. 9 to 13 illustrate modified forms of such core members together with arrangements of primary and secondary windings thereon, Fig. 12 illustrating also clamping frame structures by which any of the various core members may be adjusted with respect to each other and to the object.

Fig. 14 diagrammatically illustrates a core member of a magnetic induction device cooperating with an object cross-wise thereof as distinguished from lengthwise cooperation as in the previous figures.

Fig. 15 illustrates a combination of both the lengthwise and crosswise cooperation of electro-magnetic induction devices with respect to an object.

Fig. 16 is a fragmentary end detail view illustrating the cooperation of the end of a core member of an electro-magnetic device for co-operating with the sides of an object and having lengthwise cooperation with an object.

Fig. 17 is a fragmentary side view illustrating a manner in which two such pole ends of an electro-magnetic induction device may cooperate with an object.

Fig. 18 is a plan view of an organization of the apparatus as applied particularly in the testing of rails.

Fig. 19 is a vertical sectional view taken substantially on lines 19—19 of Fig. 18, parts being shown in side elevation and parts broken away.

Fig. 20 is a vertical sectional view taken substantially on lines 20—20 of Fig. 18, parts being shown in end elevation and parts broken away.

Fig. 21 diagrammatically illustrates apparatus for passing electric current through a rail and cooperating therewith in the manner shown in Figs. 13, 18, 19 and 20.

Fig. 22 diagrammatically illustrates apparatus employing high frequency alternating current as supplied by an oscillator.

Referring to the drawings, in each of the diagrammatical illustrations of the magnetic induction device, Figs. 1 to 15 inclusive, the apparatus comprises transformer elements including core pole members $p^1$ and $p^2$ and a connecting core member or yoke $c$ and these core members are adapted to cooperate with a body M which may be fixed or movable with respect to the magnetic induction apparatus. The magnetic induction apparatus is characterized by having a primary winding P and mounted on any one of the core members are secondary windings S, or plurality of secondary windings $S^1$, $S^2$ and $S^3$ which are associated with the various core members but preferably in most instances with pole members $p^2$ and adjacent to the lower ends thereof.

In Fig. 1 it will be noted that the primary winding P is mounted on the core member $p^1$ and the secondary winding S, mounted on the core member $p^2$ and connected with a translating device T. By translating device, it is understood that I mean any devices and apparatus well known in the art such as detectors, indicating devices, recorders, signaling devices, amplifiers, relays, control apparatus and the like. It will be noted that when the transformer is energized by supplying current to the primary winding P—alternating current, although direct current may be employed in some instances—the secondary windings will supply a proportional amount of energy to the translating device T depending upon various factors including the ratio of the number of turns in the primary winding P and secondary winding S, the characteristics of the core members $p^1$, $p^2$ and $c$, and the body M. Further it will be noted that in arranging the primary and secondary windings P and S on the opposite core members $p^1$ and $p^2$ respectively, where the core members are of considerable length, leakage is produced in the induction device around the primary, core and windings, and this leakage is increased by air gaps G at the ends of the cores adjacent to the body M and if the body M is of lower magnetic characteristics, or anti-magnetic, the leakage is of high magnitude. Accordingly, the characteristics of the body M must be taken into consideration in determining the inductance of the primary winding as well as the frequency of the alternating current supplied thereto, and further the proportion of the number of turns on the secondary winding S with respect to the primary winding P must be taken into consideration as will hereinafter be more fully set forth.

Not only must the magnetic characteristics of the body M be considered but the core members of the magnetic induction device as well. In railway signal apparatus, safety apparatus, and other translating devices operated thereby, as well as rail flaw detecting devices, the cores are preferably constructed of steel having high magnetic characteristics for the transformer cores, and where alternating current is supplied to the primary winding for energizing the induction apparatus the core members may be constructed of transformer sheet this being suitable and preferable for either A. C. or D. C. operation, and in using such sheet material the cores may be arranged with overlapping joints and in some instances butt joints. The production of magnetic leakage between the primary and secondary cores and the windings may be accomplished in various ways, as for example in Fig. 2 the leakage is increased by contracting the core member $c$ as shown at $d$. In Fig. 3 the core members constituting the poles $p^2$ and connecting member $c$ are relatively a smaller cross section than the core $p^1$ upon which the primary P is positioned; in this arrangement the core parts are of a different shape and the pole faces cooperating with the body M are spaced close together as compared with disclosures in Figs. 1 and 2. In Fig. 4 the core member $p^2$ is disclosed as a separate element having a gap $G^1$ between the end which cooperates with the connecting core member $c$.

The principle of producing leakage is further illustrated by movable core members or magnetic shunts $s$ in Figs. 5 and 6; these shunting cores cooperate both with the transformer core members $p^1$, $p^2$ and $c$ and the body M. In Fig. 5 it will be noted that the core member $s$ forms a magnetic path around the primary winding P by way of pole member $p^1$ connecting member $c$ and shunt $s$, and variable air gaps. In Fig. 6 the shunt path includes the member M to a greater extent as well as the same core members and in each of these the shunt has the effect of producing variations of greater proportions in the core member $p^2$ which in turn varies the potentials produced by the secondary winding S thereon.

In Fig. 7 the arrangement is such as to provide leakage by gaps $G^1$ and $G^2$ at each end of the connecting core member $c$. The primary in this instance is shown mounted on the connecting core member $c$ and each of the core members $p^1$ and $p^2$ has secondary windings $S^1$ and $S^2$ mounted thereon, either or both of which may be connected with a translating device or translating devices.

In Fig. 8 an arrangement of core members is disclosed wherein the pole members are adapted to swing with respect to the connecting core member; for purposes of illustration the pole member $p^2$ only is shown as being movable but either of these and preferably both are so arranged. In this case the primary winding is preferably mounted on the connecting core member $c$ as disclosed in Fig. 7 and in the arrangement shown in this figure either or both of the core members $p^1$ and $p^2$ which are shown separate from the connecting core member $c$ can swing with respect to core member $c$ as indicated in Fig. 8.

While the core members or body member M are preferably mounted for movement in a plane of the core members with respect to the body member, the induction device is likewise adapted for the relative movement crosswise of the said body member, as by moving the body M between the core members $p^1$ and $p^2$, as illustrated in Fig. 14, or below the same. An arrangement such as disclosed in Fig. 8 wherein either or both of the pole members may be swung to different relative adjusted positions is particularly adapted for such crosswise arrangement of the induction devices with respect to the object M.

In Fig. 9 an induction device of the character disclosed in my patent hereinbefore referred to, is illustrated, wherein the arrangement for varying the magnetic leakage of the character hereinbefore set forth is applied thereto. In this arrangement the core member $c$ has an upwardly extending shunting core member $p^3$ and a shunting core member $s^1$ and the cores may be so arranged that there are air gaps $G^3$ and $G^4$ as well as the gap $G^5$ which is disclosed in said patent. In this arrangement the secondary winding may be placed wherever desired, and by way of example secondary windings $S^1$ and $S^2$ are shown positioned on core members $p^1$ and $p^3$ and connected with a translating device T.

In Figs. 9 to 12 inclusive core arrangements similar to those already described are illustrated with modified arrangements of the transformer windings and their connections with translating devices. In Fig. 10 the primary winding P is positioned on one of the pole core members and the secondary winding S is positioned on the other pole core member. In Figs. 11 and 12 the primary windings are similarly positioned, however, in Fig. 11 the secondary windings $S^1$ and $S^2$ are associated with each of the pole core members and preferably connected in bucking relationship with respect to each other and with the translating device T. In Fig. 12 the secondary winding $S^1$ on core member $p^2$ is connected in bucking relationship with a variable portion of the primary winding P and with the operating winding of the moving part of an indicating or recording instrument and an additional secondary winding $s^3$ is movably mounted along the core member $c$ and is adapted to furnish a magnetizing current for an indicating or recording type of instrument which is diagrammatically represented as a translating device T.

The core members are relatively adjustable with respect to each other and with respect to the body M and as particularly shown in Figs. 10 and 12 the core members or yokes $c$ may be moved outward from the ends of the core members $p^1$ and $p^2$ and it may be desirable to construct the primary and secondary windings so that the secondary winding will deliver the same or substantially the same voltage as supplied to the primary winding in the arrangement shown in Fig. 10, or the arrangement may be such that the induction device will actually operate as a step-up transformer so that the secondary S will deliver a high voltage, or in some instances, a lower voltage than that supplied to the primary P. In the event a higher voltage is desired and relatively a lower voltage translating device T is to be operated thereby the secondary windings $S^1$ and $S^2$ as shown in Fig. 11 may be wound so as to deliver the desired voltages or as shown in Fig. 12 the primary winding P, or a part thereof, may be employed in place of the secondary winding $S^2$. In such arrangements it is to be noted that under balanced conditions of the core members and body M the terminal voltage supplied to the translating device T may be small, approaching zero, a minimum relatively small voltage as will be referred to hereinafter, and this voltage will vary, as produced by variations in the body M, for example. Thus in adjusting the core members, the general character of the body M must be taken into consideration and the relationship of the core member $c$ and/or either pole core member with respect to the core members $p^1$ and $p^2$. As to the magnetic leakage it is found for example that when employing transformer core members of laminated material each core having a cross section of about 1¼" by 2¾" and about 9½" in length with the core member $c$ substantially engaging the core members $p^1$ and $p^2$ and very small gaps between the core members $p^1$ and $p^2$ and a magnetic body M (such as a steel railway rail) and energizing them so that substantially maximum permeability of the transformer sheets is obtained within the primary winding P the leakage is such that the induction in pole member $p^2$ in the vicinity of secondary S is substantially half of that in the pole member $p^1$ and is materially decreased by increasing the air gaps. However, by such an arrangement the windings may be constructed of conductors of such size that considerable power for operating translating devices of the character of power operated indicating or recording instruments may be obtained.

Naturally, by increasing the air gaps materially, such power as is delivered by the secondary is materially reduced, and depending on the nature of the body M the frequency of the supply current must be varied. In the event the body M is not of magnetic material or is positioned at a substantial distance therefrom a high frequency supply such as an oscillator O may be employed as represented in Fig. 22, wherein the primary and secondary winding $L^1$ and $L^2$ are provided with air cores and high frequency oscillation generators, and detecting apparatus are employed in connection with these inductance coils; such an arrangement is particularly adapted for qualitative and quantitative analyses, or mineral detection and the like.

In the arrangement shown in Fig. 12 the variable voltage secondary coil $S^1$ and portion of primary winding P are connected with a translating device T which is supplied with a magnetizing current from the secondary $S^3$. This secondary $S^3$ is positioned on core $c$ so that the phase relationship is midway between that of primary and secondary P and $S^1$ and thus compensates for variations in phase relationship in the magnetic induction device.

The arrangement whereby the cores may be relatively adjusted, as referred to above, is illustrated in Fig. 12 wherein a lower clamping frame member 38 is secured to the pole core members adjacent to the lower ends thereof by means of bolt and wing nuts 39. This clamping frame is provided with end brackets 41 which are supported on elevation adjusting bolts 42 as more fully disclosed in connection with Figs. 18, 19 and 20, whereby either or both ends may be raised and individually adjusted with respect to the body M. The upper ends of the pole members are secured in a clamping frame 20 by means of bolts 39 and it will be seen that the two clamping frames 20 and 38 afford means whereby the spacing and relative positions of the pole core members may readily be adjusted. Upper clamping frame 20 supports upright frame pieces 21 with a horizontal top frame piece 22 for supporting the connecting core c or yoke which is held by clamps 23. The connecting core clamps 23 are supported by means of bolts 24 extending through frame piece 22 and by means of the wing nuts on these bolts the gaps between the ends of pole core members and connecting core member c may be variably adjusted with respect to each other. While the clamping members may be of metallic or any other material, wood, fiber or like material being preferable, as well understood, so that there will be a minimum effect on the induction device and particularly where fluctuating or alternating fields exist.

While variation of phase relationship may be advantageous in some instances where it is too great, the induction device diagrammatically illustrated in Fig. 13 and shown in plan and elevation in Figs. 18, 19 and 20, except for the location of primary winding P which may be moved and adjusted on the core members as desired, provides for an improvement in the phase relationship by providing a pair of secondaries $S^1$ and $S^2$ which are mounted on divided pole members $p^21$ and $p^22$ which each has substantially half of the cross-sectional area of the core member $p^1$; the cross sections of the cores may be otherwise modified or varied as to cross sectional areas. In this arrangement there may be a small difference in the phase relation between the induction coils and the leakage between the core member is not so important as in the former arrangements and preferably the yoke member c is connected with the pole members in such a manner that the reluctance between them is relatively low, or they may be integral with each other; but advantageously the pole members are separate so that their relative spacing may be varied as desired in clamps as shown in Figs. 12, 18, 19 and 20. In this arrangement the operation is dependent more upon variations in the magnetic circuit as afforded by two parallel paths provided by the two smaller pole members upon which the secondary windings $S^1$ and $S^2$ are mounted. The reluctance of the magnetic circuit through the pole member $p^22$ is greater than through pole member $p^21$, and thus in order to obtain a balance of the potentials produced by the secondaries $S^1$ and $S^2$, $S^1$ must have the greater number of turns, or the balance may be obtained by varying the cross-sectional areas of the pole cores. However, it is found that the exact ratio of the number of turns on these two windings is not critical since by adjustment of the magnetic induction device with respect to the body M these windings may be placed in balance so as to deliver a balanced relatively small minimum voltage under normal operating conditions to the translating device T which may be a volt meter or recording instrument or any other device or apparatus well known in the art.

In operation of this arrangement the core members are adjusted with respect to the body M, or stationary rail, preferably so that the potentials of the two secondary windings $S^1$ and $S^2$ are equal or substantially equal and in this condition they deliver a small minimum voltage, as stated above, which represents a phase difference between these potentials. When the equipment is moved with respect to body M, or longitudinally of a rail, this phase difference will vary. In detecting a fissure in a rail there are two distinct indications in a measuring instrument (T); when the core with winding $S^2$ is over the fissure there is a sharp increase in this minimum voltage followed by a reduction to the average normal difference and then a sharp decrease in the voltage when the core with winding $S^1$ is over the fissure, that is a decrease in the phase displacement of the potentials of the two windings, or substantially the same indications will take place in the reverse order in the event the equipment is moved in the opposite direction. It is to be observed that movement of the core $p^1$ over the fissure has little if any effect on this phase displacement between the voltages of the two windings. The variation in phase relationship particularly the improvement in phase relationship as indicated by the sharp decrease in voltage when the core with the winding $S^1$ is over a fissure is important in detecting a fissure although the sharp change first one way and then the other may be an additional help in making inspections.

Referring to Fig. 14 the pole members of the magnetic induction device are illustrated as straddling the sides of a body M for relative movement of the device longitudinal of the body M and Fig. 15 discloses the arrangement of two magnetic induction devices, one extending crosswise and the other lengthwise with respect to the body M. By these two magnetic induction devices the character of the defects in the body M may be ascertained. For example, when they are mounted for traversing a rail head, or pairs of them on each side rail in the manner as indicated in Fig. 18, the general character of rail head fissures may be indicated by translating devices T connected therewith, such as indicators or recorders whereby transverse and longitudinal fissures will be indicated; thus the nature of such defects can be determined.

In Figs. 16 and 17 the lower ends of pole members $p^1$ and $p^2$ are shown with depending side elements d arranged one on one side and the other on the other side of body M in the form of a rail head, which pole members and rail are adapted for longitudinal movement with respect to each other. These are illustrative of arrangements of pole faces of the core members with respect to varying shapes of objects with which the magnetic induction device is to be associated.

In Fig. 21 is illustrated an electric current arrangement for flaw detection similar to the form of magnetic induction device shown in Fig. 13. In this arrangement electric current supply R is conducted to brushes B, $B^1$, and $B^2$ engaging the surface of body M, brush B receiving current through conductor 25 from one side of the supply R and the other side of the supply is connected by way of conductors 26 through a resistance 27 and conductors 28 with brushes $B^1$ and $B^2$ which are in spaced relationship. These brushes $B^1$ and $B^2$ in turn are connected by conductors 29 with a translating device T of the voltmeter type. Obviously the brushes B, B¹, and B² may represent heavy brushes or groups of brushes since it is desirable to pass relatively heavy current through the object M particularly where the device is for testing rails and movable relatively thereto. This current arrangement for detection of rail flaws may be mounted on flaw detector carriers connected with a detector car as indicated in Fig. 18 by way of example.

An application of the magnetic induction device as applied in the testing of railway rails is disclosed in Figs. 18, 19 and 20. As shown magnetic induction devices 30 particularly of the character disclosed in Fig. 13 are associated with each of the two rails 31 of a railway track and maintained in a constant relationship with respect to the rail heads for lengthwise movement relative thereto. These magnetic induction devices are each mounted in wheel supported structures 32 with the flanges of the wheel 33 engaging the inner side faces of the heads of rail 31 and these wheel structures are preferably connected by cross bars 34 whereby they are always maintained in the same relationship with respect to parallel and equally spaced rails and they are further connected with the bottom portion 35 of a detector car or other detector vehicle in which testing equipment and the like are carried. The suspending means may include, by way of example, cylinders 36 and rods 37 whereby the wheeled supports may be brought into engagement with or elevated from the rails 31. The cylinders as shown have fluid pressure and spring means operating on opposite sides of the pistons on rods 37 for elevating and positioning the detectors in flaw detecting cooperation with the rails. Although spring means are shown in cylinder 36 for pressing the detector carrier into cooperation with the rails preferably fluid pressure may be employed for this purpose as a convenient manner for regulating the pressure and likewise the spring means may be arranged for elevating the carriage when the pressure is released, or any other means for raising the carriage to and maintaining it in elevated position may be employed. It will be apparent that in the event the detector vehicle is to carry the detectors so as to cooperate with other objects or materials wheels 33 may be provided, omitting the flanges if desired, and when necessary rollers for engaging the sides of the object such as disclosed in my patent may be employed to advantage on the detector carrier 32.

The magnetic induction devices each have their pole pieces $p$, $p^{21}$, $p^{22}$ secured in adjusted positions, as also shown and described in connection with Fig. 12, by lower clamp members 38 preferably secured by bolt and wing nuts 39 adjacent to the lower ends thereof. Transformer windings $S^1$ and $S^2$ are mounted on these core members below the clamps and may be suitably supported in said positions by and below these clamps. The upper ends of these pole members and the core member $c$ are secured by clamp members 40 in a similar manner with the primary winding P preferably mounted on the core $c$ and adjustable therealong; the arrangement of the core members may be varied and with primary winding positioned on core $c$ the pole core member $p^1$ may be omitted and still obtain variations afforded by the split pole members arrangement. The lower clamps 38 are each provided with a bracket 41, which brackets are engaged by bolts 42 extending upwardly through cross frame elements 43 of the wheeled supports and guide blocks 44 positioned above the same. By means of adjusting nuts 45 on these bolts 42 the elevations of the pole members with respect to the heads of rails 31 may be adjusted and the guide blocks 44 are of sufficient height to engage the outer ends of clamp members 40 at any height to which either or both ends of the induction device are elevated, or by other suitable guide means on the wheeled carrier 32 may be employed for guiding the upper end of the induction devices if desired.

As shown rods 42 in their cooperation with the cross frame elements 43 maintain the lower portions of the detectors in proper position with rail head or object and guide blocks 44 in cooperation with the upper clamp members 40 maintains the upper portion of the detectors in proper position. The weight of the detectors, suspended through brackets 41 on bolts 42, maintain an adjusted elevation of the detectors with respect to the heads of the rails but in the event it is desired to establish more positive cooperation therewith the weights thereof may be increased or springs or other pressure means pressing the detectors downwardly with respect to carrier may be provided. It will be noted that pressure in cylinder 36 tends to assure a positive cooperation of the carriage and the rails.

I do not wish to limit myself to any of the specific constructions or modes of operation described above in this specification for purposes of giving examples of illustrations of employment of the invention, for it will be obvious that wide departure from the above may be made without departing from the spirit and scope of my invention, which is as set forth in the following claims.

I claim:

1. Electromagnetic induction apparatus cooperating with a shunting member for operating a translating device, comprising a plurality of core members cooperating with each other and with the shunting member to provide a variable magnetic circuit, a primary transformer winding on one of said core members adjacent to the shunting member, a secondary circuit translating device operating winding on a core member remote from the core of said primary winding, and means for increasing the reluctance of the path through the core members between the windings by adjusting the core members relatively with respect to each other.

2. Electromagnetic induction apparatus for cooperating with a shunting element comprising a plurality of core members cooperating therewith in a magnetic circuit, transformer windings on certain of said core members, means for adjusting said core members with respect to each other and to the shunting element to produce an adjusted relationship of the induction in different members of the core and in the shunting element, and a core member adjacent to the shunting element and other core members of the magnetic circuit and adjustable with respect thereto for varying the magnetic induction in parts of the magnetic circuit with respect to the magnetic induction in other parts thereof.

3. Electromagnetic induction apparatus cooperating with a shunting member for operating a translating device, comprising core members cooperating with the shunting member and movable with respect thereto to provide a variable magnetic circuit, a primary transformer winding on one of the core members, a secondary circuit translating device operating winding on another of the core members, and a shunting core member adjustably cooperating with said core members and said shunting member and positioned between said windings.

4. Electromagnetic induction apparatus cooperating with a shunting member for operating a translating device, comprising core members cooperating with the shunting member and movable with respect thereto to provide a variable magnetic circuit, a primary transformer winding on one of the core members, and secondary circuit translating device operating windings on adjacent core members thereof having the same polarities with respect to each other, said windings being connected in bucking relationship and when the primary winding is energized cooperating to produce a relatively low differential voltage under normal conditions of cooperation of the apparatus with the shunting member by the phase angle displacement of the potentials produced in the secondary windings with respect to each other.

5. Electromagnetic induction apparatus cooperating with a shunting member for operating a translating device, comprising core members cooperating with the shunting member and movable with respect thereto to provide a variable magnetic circuit, a primary transformer winding on one of the core members, and secondary circuit translating device operating windings on core members thereof connected in bucking relationship, one of said windings consisting of at least a part of the primary winding.

6. Electromagnetic induction apparatus cooperating with a shunting member for operating a translating device, comprising core members cooperating with the shunting member and movable with respect thereto to provide a variable magnetic circuit, a primary transformer winding on one of the core members, secondary circuit translating device operating windings on core members thereof connected in bucking relationship, and an independent secondary winding on one of the core members having a separate connection with the translating device.

7. Electromagnetic flaw detecting apparatus cooperating with a shunting member for operating a translating device, comprising core members including a split pair of core elements directly cooperating with the shunting member in the magnetic circuit, a primary transformer winding on one of the core members, secondary windings on said split pair of core elements connected in bucking relationship with the translating device, and means for energizing said primary winding so as to produce substantially equal potentials in said secondary windings with a normally small phase angle displacement between them.

8. Electromagnetic induction apparatus cooperating with a shunting member for operating a translating device, comprising core members including a split pair of core elements directly cooperating with the shunting member in the magnetic circuit, a primary transformer winding on one of the core members, secondary windings on said split pair of core elements connected in bucking relationship with the translating device, and means for energizing said primary winding so as to produce substantially equal potentials in said secondary windings with a normally small phase angle displacement between them producing a relatively low differential potential, which differential potential is increased when one of the split core elements passes over a flaw in the shunting member and a decrease of the phase angle is effected with a resultant lower potential difference when the other split core element passes over the flaw in the shunting member.

9. Electromagnetic flaw detecting apparatus comprising a core having depending pole members including a pair of split pole elements, a primary winding for magnetically energizing the core, and said split pole elements each having a secondary winding thereon, the number of turns of each of said secondary windings being in such proportion that the flux-turns of each of the secondary windings is substantially equal so that substantially equal voltages are produced in the two secondary windings by A. C. energization of the primary winding, said secondary windings being connected in bucking relation so that under normal conditions their combined output potential is a continuous relatively low minimum voltage representing the phase angle of the placement of the potentials produced in the windings individually when the primary winding is subjected to A. C. energization.

10. Electromagnetic induction apparatus for operating a translating device, said apparatus having core members including pole cores cooperating with an object, said pole cores having windings thereon connected in bucking relationship with the translating device, and means for independently adjusting the pole cores with respect to the object.

11. Electromagnetic flaw detecting apparatus for operating a translating device, said apparatus having core members including pole cores cooperating with an object, said pole cores having windings thereon connected in normally substantially potentially balanced bucking relationship with the translating device producing a relatively low minimum differential voltage due to the phase angle displacement of the potentials produced in the secondary windings with respect to each other under normal conditions of operation, and means for independently adjusting the pole cores with respect to the object.

12. The method of testing objects which consists in passing electric current into and out of an object, splitting one of the passageways to provide spaced passage points, and detecting variations of the current passed through and between said spaced passage points with respect to each other.

13. The method of testing objects by magnetic flux which consists in producing a magnetic flux including the object in the field thereof, dividing the field of flux as it is introduced into the object, and detecting variations in the portions of the divided field with respect to each other.

14. In a detector vehicle operable along an object, supporting means for electromagnetic induction apparatus having a plurality of core members comprising, a support suspended from the detector vehicle for relatively moving the apparatus with the vehicle in relation to the object, upper and lower clamping members for engaging the core members, adjustable suspending means between the support and the lower clamping member for supporting the lower portion of the apparatus in an adjustably spaced position above the object, and means on the support engaging between the outer ends of the upper clamping member for guiding the upper part of the apparatus with respect to the support.

15. In a detector vehicle for moving over the surface of an object to be tested, a magnetic induction apparatus having a plurality of pole members for cooperating with the surface of the object under test, supporting means for said magnetic induction apparatus suspended from the vehicle, independently adjustable vertical connection and guide elements between the supporting means and the lower ends of the pole members of the magnetic induction apparatus whereby the ends of the pole members thereof may be differentially vertically adjusted with respect to the surface of the object with which they cooperate, and guide means for the upper portions of the magnetic induction apparatus.

16. In a detector vehicle for moving over the surface of an object to be tested, a magnetic induction apparatus having a plurality of pole members for cooperating with the surface of the object under test, supporting means for said magnetic induction apparatus suspended from the vehicle, and independently adjustable connections between said supporting means and the magnetic induction apparatus whereby the pole members thereof may be differently adjusted with respect to the surface of the object with which they cooperate.

17. In a detector vehicle for moving over the surface of an object to be tested, a magnetic induction apparatus having a plurality of pole members for cooperating with the surface of the object under test, supporting means for said magnetic induction apparatus suspended from the vehicle, and independently adjustable guiding and supporting means connecting each end of said magnetic induction apparatus to the supporting means for positioning it with its pole members in proper cooperation with the object under test.

18. In a rail flaw detecting apparatus, a detector car for moving over the surface of a rail to be tested, a flaw detector comprising magnetic induction apparatus having a plurality of downwardly extending pole members whose pole faces are adapted to cooperate with the upper surface of the rail, supporting means for said flaw detector comprising a detector carriage suspended from the detector car and adapted to be positioned in a flaw detecting cooperative position with respect to the rail under test, and independently vertically adjustable supporting and guiding elements connecting end portions of the flaw detector with the detector carriage supporting means whereby the height above and a lengthwise angular position of the pole faces of the electro-magnetic flaw detector element may be adjusted with respect to the surface of the rail under test.

19. In a detector vehicle for moving over the surface of an object to be tested, a magnetic induction apparatus comprising a core having depending pole members including a pair of split pole elements, said pole members adapted to cooperate with the surface of the object under test, said magnetic induction apparatus having an energizing primary winding thereon, and each of the split pole elements having secondary windings thereon having the number of turns thereof such that the flux-turns of each of the secondary winding is substantially equal so that substantially equal voltages are produced in the two secondary windings by A. C. energization of the primary winding, supporting means for said magnetic induction apparatus suspended from the vehicle, and independently adjustable connections between said supporting means and the magnetic apparatus whereby said pole members thereof may be differently adjusted with respect to the surface of the object with which they cooperate so that the relation of the voltages of the secondary windings may be adjusted as well as the distance of the pole members above the surface of the object under test.

20. In a detector car operable along the rails of a track, flaw detectors adapted to cooperate with each of the rails of the track, supporting and connecting means between the flaw detectors, independently adjustable means between the ends of each of said detectors and said supporting and connecting means for individually adjusting the ends of the detectors whereby their heights above the rails may be differently adjusted with respect to each other for positioning them in flaw detecting cooperation with the rails, supporting and connecting means between said flaw detector connecting means and the detector car for positioning the detectors into flaw detecting cooperation with the rails and suspending them from the detector car.

21. In a detector car operable along the rails of a track, flaw detectors adapted to cooperate with each of the rails of the track, supporting and connecting means between the flaw detectors, independently adjustable means between the ends of each of said detectors and said supporting means for individually adjusting the ends of the detectors whereby their heights above the rails may be differently adjusted with respect to each other for positioning the detectors in flaw detecting cooperation with the rails and maintain them in the same relative positions with respect to the rails during movement along the rails, connecting means on the detector car for suspending the detector supporting and connecting means from the car and positioning them into flaw detecting cooperation with the rails, and flaw indicating means carried by the car and operated by said detectors.

22. The method of testing objects for flaws comprising passing electrical energy progressively into portions of an object between three spaced points, and exploring the object with flaw detecting means covering the portion between two of said points embracing a portion of the object subjected thereby to a lower concentration of electrical energy than an adjacent portion beyond said two points which is subjected to a higher concentration of electrical energy.

23. The method of testing objects which consists in passing electrical energy through an object, subjecting adjacent portions of the object to concentration of energy of different magnitudes, and exploring the portion subjected to the concentration of energy of the lower magnitude with detecting means for detecting the differential variations of the total energy as it is passed into the portion of the object subjected to the lower concentration of energy.

24. The method of testing objects which consists in passing electrical energy through an object, subjecting adjacent portions of the object to concentration of energy of different magnitudes, and exploring the section subjected to the concentration of energy of the lower magnitude with detecting means including a plurality of detector coils connected in bucking relationship.

25. A flaw detecting apparatus comprising, electromagnetic induction apparatus cooperating with an object to be tested for operating a flaw indicating device, including a plurality of core members cooperating with each other and with a portion of the object providing a variable magnetic circuit, a primary transformer winding on one of the core members, a secondary circuit indicating device operating winding on another core member, and means for adjusting the induction of the magnetic circuit through the core members and portion of the object by adjusting core members relatively with respect to each other at a position in the induction apparatus between the two windings.

26. A flaw detecting apparatus in accordance with claim 25 including a shunting core member cooperating with the object under test and a core member of the induction apparatus to provide a second magnetic circuit through the induction apparatus and object shunting induction from the magnetic circuit of said secondary winding.

HAROLD C. THORNE.